(12) United States Patent
Bian et al.

(10) Patent No.: US 9,082,442 B2
(45) Date of Patent: Jul. 14, 2015

(54) SYSTEM, METHOD AND APPARATUS FOR ONSET MAGNETIC OXIDE LAYER FOR HIGH PERFORMANCE PERPENDICULAR MAGNETIC RECORDING MEDIA

(75) Inventors: Xiaoping Bian, Saratoga, CA (US); Jyh-Kau Chang, Fremont, CA (US); Weikang Shen, San Jose, CA (US); Zhupei Shi, San Jose, CA (US); Kai Tang, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 1833 days.

(21) Appl. No.: 12/210,603

(22) Filed: Sep. 15, 2008

(65) Prior Publication Data

US 2010/0067149 A1   Mar. 18, 2010

(51) Int. Cl.
*G11B 5/66* (2006.01)
*G11B 5/667* (2006.01)
*B82Y 25/00* (2011.01)
*B82Y 40/00* (2011.01)
*H01F 10/30* (2006.01)
*H01F 41/30* (2006.01)
*G11B 5/82* (2006.01)
*G11B 5/84* (2006.01)

(52) U.S. Cl.
CPC ............... *G11B 5/667* (2013.01); *B82Y 25/00* (2013.01); *B82Y 40/00* (2013.01); *G11B 5/66* (2013.01); *H01F 10/30* (2013.01); *H01F 41/302* (2013.01); *G11B 5/82* (2013.01); *G11B 5/8404* (2013.01)

(58) Field of Classification Search
USPC ................. 428/827, 828, 828.1, 829, 830
See application file for complete search history.

(56) References Cited

U.S. PATENT DOCUMENTS

| | | | |
|---|---|---|---|
| 6,143,388 A | 11/2000 | Bian et al. | |
| 6,242,086 B1 | 6/2001 | Song et al. | |
| 6,641,936 B1 | 11/2003 | Chen et al. | |
| 2003/0096140 A1 | 5/2003 | Tomiyasu et al. | |
| 2005/0186450 A1* | 8/2005 | Takenoiri et al. | 428/827 |
| 2005/0249981 A1 | 11/2005 | Cheng et al. | |
| 2006/0286413 A1* | 12/2006 | Liu et al. | 428/829 |
| 2007/0141400 A1 | 6/2007 | Marinero | |
| 2007/0231609 A1 | 10/2007 | Ajan et al. | |
| 2007/0292721 A1 | 12/2007 | Berger et al. | |
| 2008/0057349 A1 | 3/2008 | Berger et al. | |
| 2008/0070065 A1 | 3/2008 | Berger et al. | |

FOREIGN PATENT DOCUMENTS

| | | | |
|---|---|---|---|
| WO | 2006046732 A1 | 5/2006 | |
| WO | 2006134952 A1 | 12/2006 | |

* cited by examiner

*Primary Examiner* — Holly Rickman
*Assistant Examiner* — Lisa Chau

(57) ABSTRACT

Perpendicular magnetic recording media has been enhanced by controlling the initial growth of magnetic oxide layers and increased magnetic isolation between the grains in the initial magnetic layer. An onset magnetic oxide layer is sputter deposited in an argon-oxygen gas mixture between the main CoPtCr-oxide magnetic layers and the underlying Ru layer. The insertion of the onset magnetic oxide layer enhances the coercivity of the oxide magnetic layers and also improves the nucleation field. The media signal-to-noise ratio and bit error rate also are significantly improved due to the improvement of the initial segregation of Co magnetic grains in the magnetic oxide layers.

16 Claims, 4 Drawing Sheets

SYSTEM, METHOD AND APPARATUS FOR ONSET MAGNETIC OXIDE LAYER FOR HIGH PERFORMANCE PERPENDICULAR MAGNETIC RECORDING MEDIA

BACKGROUND OF THE INVENTION

1. Technical Field

The present invention relates in general to perpendicular magnetic recording media and, in particulars to an improved system, method and apparatus for onset magnetic oxide layer for high performance perpendicular magnetic recording media.

2. Description of the Related Art

Various forms of exchange-spring and/or capped media have been described for longitudinal media. More recently, this class of media has been the basis of perpendicular recording systems. The basic structure is a granular media layer (CoPtCrB for longitudinal media and CoPtCr-oxide for perpendicular media) that is coupled to a soft layer with relatively strong intergranular exchange. The two layers are either directly exchange coupled (i.e., capped) or the interaction is mediated through a thin exchange coupling layer (i.e., weak-link media).

There are a number of media parameters that may be optimized in an attempt to improve the performance of the recording system. In perpendicular recording systems utilizing continuous media, the capping structure contributes to many, often contradictory, aspects of recording performance. For example, on-track performance can be improved by increasing the exchange interaction between grains, but this improvement often comes at the expense of a broadening of the write width which limits available track density. The nature of the capping material also plays a role in determining both the write field needed to store the data and the resolution that can be achieved when one attempts to read-back the data.

For perpendicular recording the advantages of the two-layer structure are well established. The main advantages are improved writeability, stability and media noise when compared to a single layer granular media. The main disadvantage is relatively poor resolution and, for some cases, increased written track width.

Coercivity (Hc) and signal-to-noise ratio (SNR) of perpendicular media are dependent on the magnetic grain separation. The initial growth of the magnetic layer on the underlayer has a significant contribution to the degree of isolation between magnetic grains, and the control of microstructure in the initial magnetic layer is critical. Thus, enhancing the initial growth of magnetic oxide layers and increasing the magnetic isolation between the grains in the initial magnetic layer would be desirable.

SUMMARY OF THE INVENTION

Embodiments of a system, method, and apparatus for enhancing the initial growth of the magnetic oxide layer and increasing the magnetic isolation between the grains in the initial magnetic layer in perpendicular magnetic recording media. The invention uses an onset magnetic oxide layer that may be sputter deposited in an argon-oxygen gas mixture between the main magnetic oxide layer(s) and the underlayer (s). The insertion of the onset magnetic oxide layer enhances the coercivity of the magnetic oxide layers and also improves the nucleation field. The media signal-to-noise ratio and bit error rate are also significantly improved due to the improvement of the initial segregation of Co magnetic grains in the magnetic oxide layers.

The invention has a media structure composite with single or dual oxide magnetic alloys having approximately equal thickness. The onset magnetic oxide layer improves the initial growth of the oxide magnetic layer stack, which improves the film magnetic properties and recording properties. The selection of magnetic oxide alloys for this onset layer assists the desired performance improvement. For example, the desired magnetic oxide alloys may contain Pt in the atomic percentage range of 10% to 20%, Cr in the range of 18% to 28%, and less than 10% of $SiO_2$ or $Ta_2O_5$, $TiO_2$, $NbO_2$, $CoO$, etc. The range of thickness of the onset magnetic oxide layer (e.g., approximately 1 to 3 nm) also assists in obtaining the desired magnetic and recording properties, The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-6, embodiments of a system, method and apparatus for enhancing the initial growth of the magnetic oxide layer and increasing the magnetic isolation between the grains in the initial magnetic layer in perpendicular magnetic recording (PMR) media. The invention is well suited for applications such as hard disk drives.

The invention uses an onset magnetic oxide in the form of a continuous thin film. A continuous thin film usually contains three or more atomic (mono) layers and typically has a thickness that is greater than 1.0 nm (e.g., by the sputter deposition technique). The onset magnetic oxide may be sputter deposited in an argon-oxygen gas mixture between the main magnetic layers and the underlayers. The insertion of the onset magnetic oxide layer enhances the coercivity (Hc) of the oxide magnetic layers and also improves the nucleation field (Hn). The media signal-to-noise ratio (SNR) and bit error rate (BER) are also significantly improved due to the improvement of the initial segregation of Co magnetic grains in the magnetic oxide layers.

Figure 1:
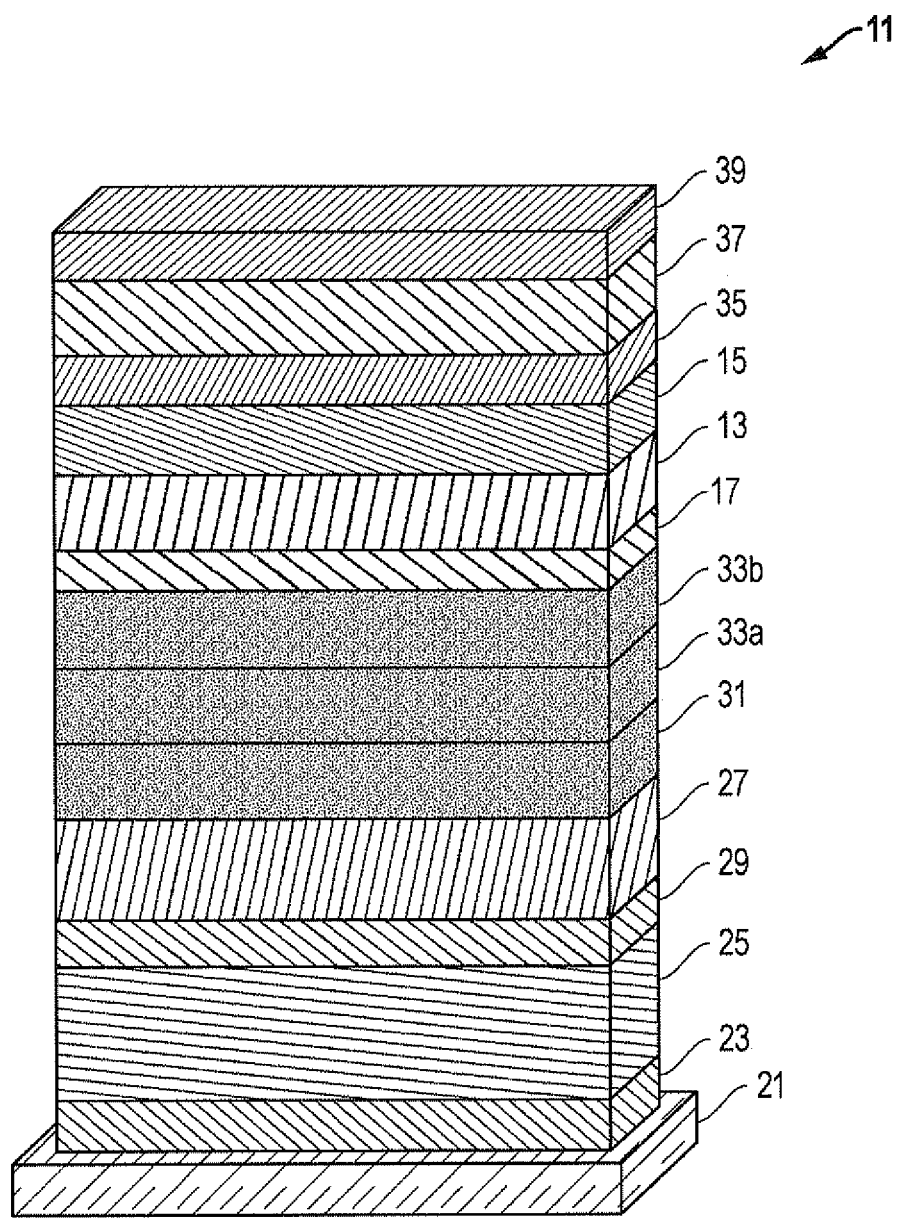
FIG. 1 is a schematic diagram of one embodiment of a media structure constructed in accordance with the invention.

One embodiment of a media structure 11 of the invention is shown in FIG. 1. The PMR media composite may comprise single or dual oxide magnetic alloys 13, 15 (e.g., CoPtCr-oxide) with roughly equal thickness. The insertion of the onset magnetic oxide layer 17 improves the initial growth of the oxide magnetic layer stack, thus improving the film magnetic properties and recording properties.

The selection of magnetic oxide alloys for the onset layer affects the desired performance improvement. In one embodiment, the magnetic oxide alloys for the onset layer 17 contain Pt in the atomic percentage range of no more than 20% (e.g., 10%-20%), Cr in the range of 18% -30% (e.g., 20%-28%), and an oxide content of 1%-12% (e.g., less than 10%) of SiO2, Ta2O5, TiO2, B2O3, NbO2, CoO, etc., or mixtures thereof. The thickness of this onset magnetic oxide layer also affects the magnetic and recording properties. For example, in one embodiment the thickness of the onset magnetic oxide layer is 1.0-3.0 nm.

In the embodiment shown in FIG. 1, the media structure 11 comprises a stack having a substrate 21 (e.g., AlMg), an adhesion layer 23, a pair of soft underlayers 25, 27 separated by a coupling layer 29, one or more seed layers 31, one or more underlayers 33 (e.g., Ru), the onset layer 17, the magnetic oxide layers 13, 15, an exchange control layer (ECL) 35, a magnetic cap layer 37, and a carbon overcoat (COC) 39.

Figure 2:
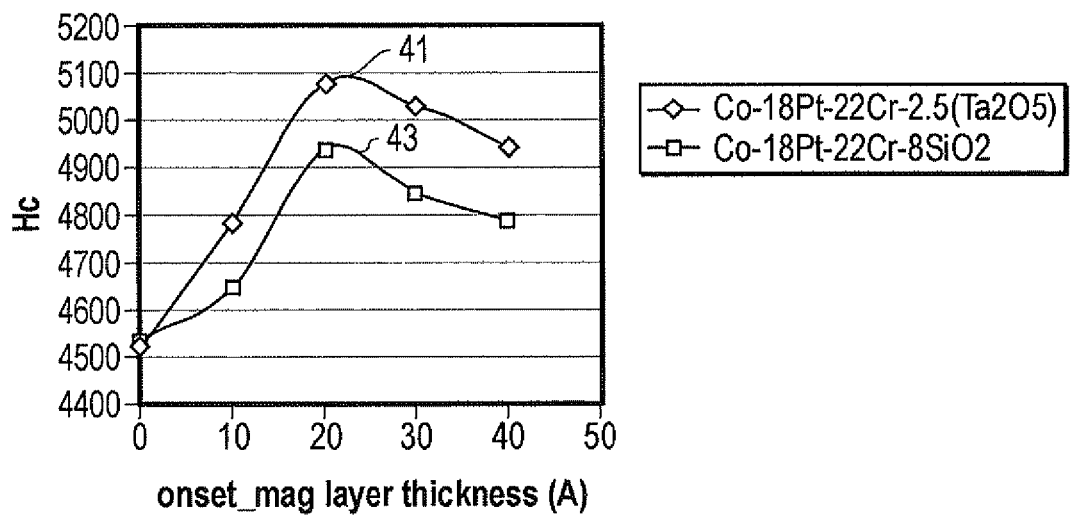
FIG. 2 is a plot illustrating the dependence of coercivity on thickness of onset layer thickness for a media structure constructed in accordance with the invention.

As shown in FIG. 2, the coercivity (Hc) of the media is dependent on the onset oxide magnetic layer thickness. There is a significant increase in Hc with an increase in the thickness of the onset magnetic layer. FIG. 2 illustrates that a maximum Hc can be achieved at about 2 nm for two different types 41, 43 of onset magnetic oxide alloys. The significant increase of Hc is obtained with a thin onset layer of around 2.0 nm, indicating the improvement of the initial growth of magnetic oxide layers. This Hc increase is also important to achieve the high unit throughput in media sputter manufacturing process.

Figure 3:
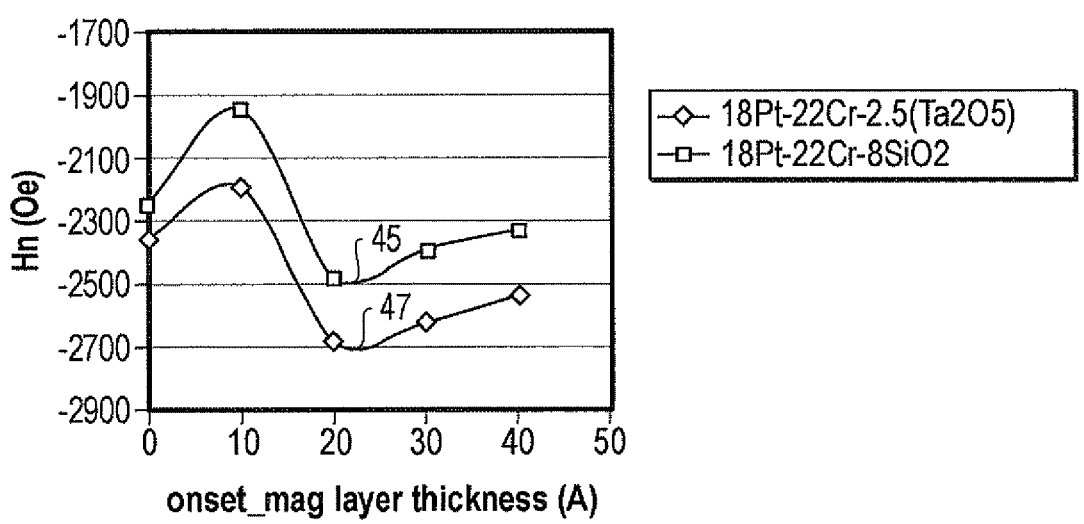
FIG. 3 is a plot illustrating the dependence of nucleation field on thickness of onset layer thickness for a media structure constructed in accordance with the invention.

FIG. 3 shows the dependence of the nucleation field (Hn) on the onset magnetic oxide alloys. The minimum Hn values for two types 45, 47 of onset layers are obtained at the onset layer thickness of about 2 nm, indicating the improvement of media thermal stability with this type of thin magnetic onset layer.

Figure 4:
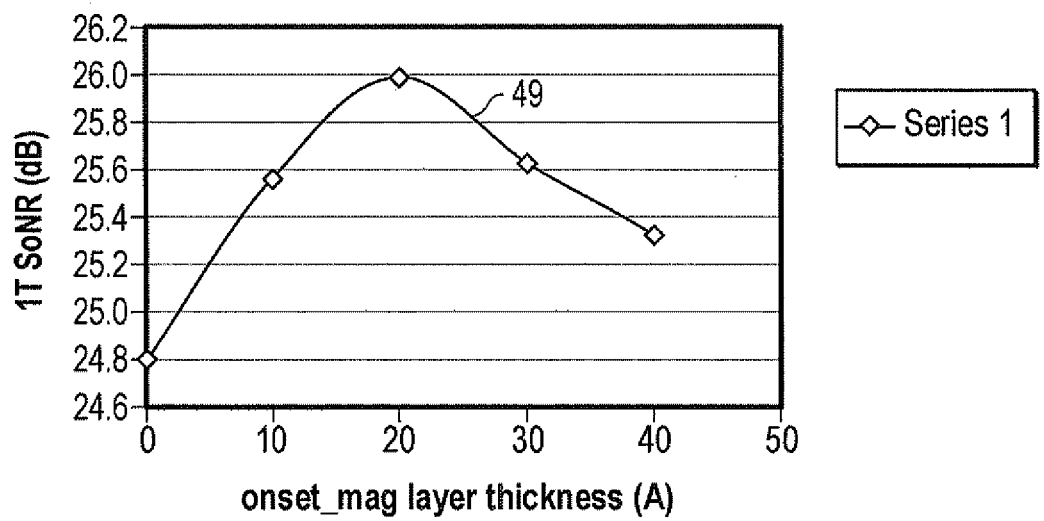
FIG. 4 is a plot illustrating the dependence of media SNR on thickness of onset layer thickness for a media structure constructed in accordance with the invention.

FIG. 4 shows the dependence of the signal-to-noise ratio (SNR) on the onset magnetic oxide layer thickness. In general, plot 49 shows that the SNR increases as the onset magnetic oxide layer increases. In some embodiments, the significant SNR improvement can be achieved when the onset layer is in the range of 1 to 3 nm. The media SNR improvement in general correlates to the soft-error-rate (SER) improvement in hard disk drive recording performance.

Figure 5:
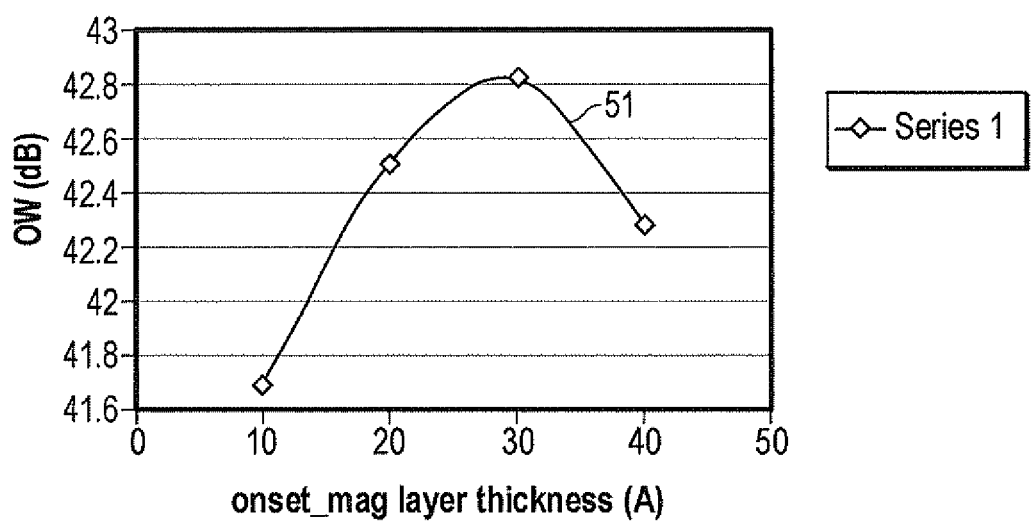
FIG. 5 is a plot illustrating the dependence of overwrite on thickness of onset layer thickness for a media structure constructed in accordance with the invention.

FIG. 5 shows the overwrite (OW) dependence on the onset magnetic oxide layer thickness. As shown by plot 51, an improvement in OW is observed in the onset layer range of 2.0 to 3.0 nm. The following table shows the overall comparison of magnetic and recording properties for the media with and without magnetic oxide onset layer.

It is clear the onset magnetic oxide layer improves the bulk magnetic properties such as Hc, Hn and SFD. These improvements translate to a significant hit error rate (BER) improvement of greater than 0.50, as shown in the table.

The invention also comprises a method of forming a media structure. In some embodiments, the method comprises providing a perpendicular magnetic recording media, including depositing at least one underlayer; depositing an onset magnetic oxide on the at least one underlayer for enhancing an initial growth of a subsequent magnetic oxide layer and increasing a magnetic isolation between grains in at least the initial subsequent magnetic oxide layer; and depositing the subsequent magnetic oxide layer on the onset magnetic oxide.

In other embodiments, the method may comprise providing the onset magnetic oxide as a continuous thin film, which may be sputter deposited in an argon-oxygen gas mixture, and have a thickness of 1 to 3 nm. The subsequent magnetic oxide layer may be formed from CoPtCr-oxide, and may comprise a pair of layers having an approximately equal thickness, and the at least one underlayer may be formed from Ru.

In still other embodiments, the onset magnetic oxide may contain Pt in an atomic percentage range of no more than 20%, Cr in a range of 18%-30%, and an oxide content of 1%-12%; or Pt comprising 10%-20%, Cr comprising 20%-28%, and the oxide content at less than 10%. The oxide content may comprise at least one of SiO2, Ta2O5, TiO2, B2O3, NbO2 and CoO. In addition, the perpendicular magnetic recording media may comprise a substrate (e.g., AlMg), an adhesion layer, a pair of soft underlayers separated by a coupling layer, at least one seed layer, the at least one underlayer, the onset magnetic oxide, the magnetic oxide layers, an exchange control layer (ECL), a magnetic cap layer, and a carbon overcoat (COC).

Figure 6:
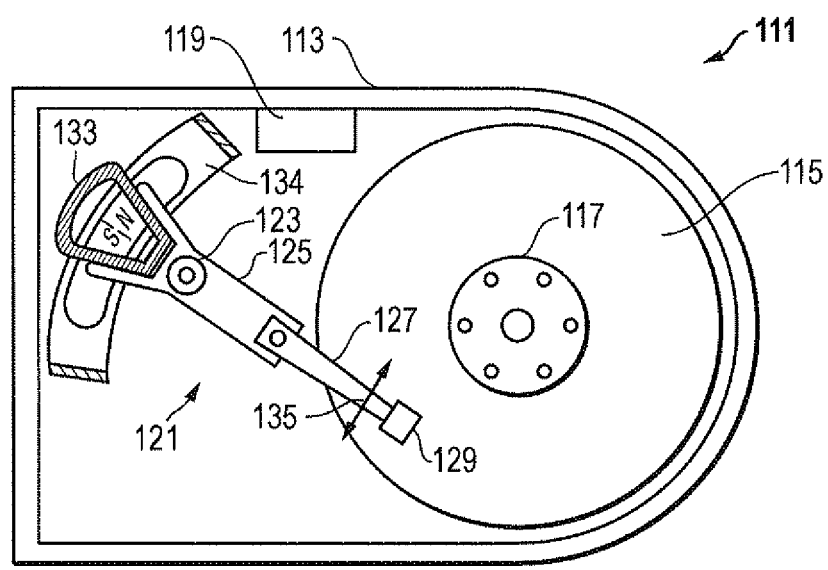
FIG. 6 is a schematic diagram of an embodiment of a disk drive constructed in accordance with the invention.

Referring now to FIG. 6, a schematic drawing of one embodiment of an information storage system comprising a magnetic hard disk file or drive 111 for a computer system is shown and constructed in accordance with the invention. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

| Media | Magnetic onset | Hc | Hn | SFD | Hs | OW | Res % | MCW (nm) | Total_SNR | BER |
|---|---|---|---|---|---|---|---|---|---|---|
| 11498 C1 | without | 4973 | −2474 | 2326 | 7442 | 35.5 | 64.6 | 150 | 16.5 | −6.4 |
| 11531 M3 | with | 5072 | −2520 | 2271 | 7475 | 36.3 | 65.6 | 151 | 17.1 | −7.1 |

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

While the invention has been shown or described in only some of its forms, it should be apparent to those skilled in the art that it is not so limited, but is susceptible to various changes without departing from the scope of the invention. For example, although the invention is well suited for applications such as hard disk drives, invention also may be used for other types of data storage applications, such as the hard-bias structure in magnetic random access memory (MRAM) device applications.

What is claimed is:

1. A hard disk drive, comprising:
   an enclosure;
   an actuator pivotally mounted to the enclosure and having a transducer for reading data from a disk;
   the disk rotatably mounted to the enclosure and having perpendicular magnetic recording media; and the perpendicular magnetic recording media comprising:
   an underlayer;
   a magnetic oxide layer; and
   an onset magnetic oxide between the underlayer and the magnetic oxide layer for enhancing an initial growth of the magnetic oxide layer and increasing a magnetic isolation between grains in the magnetic oxide layer, and the onset magnetic oxide is a continuous thin film comprising at least three atomic layers and has a thickness of 1.0 to 3 nm.

2. A hard disk drive according to claim 1, wherein the magnetic oxide layer is formed from CoPtCr-oxide, and the underlayer is formed from Ru.

3. A hard disk drive according to claim 1, wherein the magnetic oxide layer comprises a pair of layers having an approximately equal thickness.

4. A hard disk drive according to claim 1, wherein the onset magnetic oxide contains Pt in an atomic percentage range of no more than 20%, Cr in a range of 18%-30%, and an oxide content of 1%-12%.

5. A hard disk drive according to claim 4, wherein Pt comprises 10%-20%, Cr comprises 20%-28%, and the oxide content is less than 10%.

6. A hard disk drive according to claim 4, wherein the oxide content comprises at least one of $SiO_2$, $Ta_2O_5$, $TiO_2$, $B_2O_3$, $NbO_2$ and $CoO$.

7. A hard disk drive according to claim 1, wherein the perpendicular magnetic recording media comprises a substrate, an adhesion layer, a pair of soft underlayers separated by a coupling layer, at least one seed layer, the underlayer, the onset magnetic oxide, the magnetic oxide layer, an exchange control layer, a magnetic cap layer, and a carbon overcoat.

8. A perpendicular magnetic recording media, comprising:
   a substrate;
   an adhesion layer;
   a pair of soft underlayers separated by a coupling layer;
   at least one seed layer;
   at least one underlayer;
   an onset magnetic oxide;
   magnetic oxide layers;
   an exchange control layer;
   a magnetic cap layer;
   a carbon overcoat; and
   the onset magnetic oxide is located between the at least one underlayer and the magnetic oxide layers for enhancing an initial growth of at least a first one of the magnetic oxide layers and increasing a magnetic isolation between grains in said at least first one of the magnetic oxide layers, and the onset magnetic oxide is a continuous thin film comprising at least three atomic layers and has a thickness of 1.0 to 3 nm.

9. A perpendicular magnetic recording media according to claim 8, wherein the magnetic oxide layers are formed from CoPtCr-oxide, and the at least one underlayer is formed from Ru.

10. A perpendicular magnetic recording media according to claim 8, wherein the magnetic oxide layers have an approximately equal thickness.

11. A perpendicular magnetic recording media according to claim 8, wherein the onset magnetic oxide contains Pt in an atomic percentage range of no more than 20%, Cr in a range of 18%-30%, and an oxide content of 1%-12%.

12. A perpendicular magnetic recording media according to claim 11, wherein Pt comprises 10%-20%, Cr comprises 20%-28%, and the oxide content is less than 10%.

13. A perpendicular magnetic recording media according to claim 11, wherein the oxide content comprises at least one of $SiO_2$, $Ta_2O_5$, $TiO_2$, $B_2O_3$, $NbO_2$ and $CoO$.

14. A perpendicular magnetic recording media, comprising:
   a substrate;
   an adhesion layer;
   a pair of soft underlayers separated by a coupling layer;
   at least one seed layer;
   at least one underlayer comprising Ru;
   an onset magnetic oxide comprising Pt in an atomic percentage range of no more than 20%, Cr in a range of 18%-30%, and an oxide content of 1%-12%;
   magnetic oxide layers comprising a CoPtCr-oxide and having an approximately equal thickness;
   an exchange control layer;
   a magnetic cap layer;
   a carbon overcoat; and
   the onset magnetic oxide is located between the at least one underlayer and the magnetic oxide layers for enhancing an initial growth of at least a first one of the magnetic oxide layers and increasing a magnetic isolation between grains in said at least first one of the magnetic oxide layers, and the onset magnetic oxide is a continuous thin film comprising at least three atomic layers and has a thickness of 1 to 3 nm.

15. A perpendicular magnetic recording media according to claim 14, wherein Pt comprises 10%-20%, Cr comprises 20%-28%, and the oxide content is less than 10%.

16. A perpendicular magnetic recording media according to claim 14, wherein the oxide content comprises at least one of $SiO_2$, $Ta_2O_5$, $TiO_2$, $B_2O_3$, $NbO_2$ and $CoO$.

* * * * *